D. WARREN.
Car-Starters.

No. 147,207.

Patented Feb. 3, 1874.

WITNESSES.
Henry N. Miller
C. L. Evert.

INVENTOR
David Warren
Alexander & Mason
By
Attorneys.

UNITED STATES PATENT OFFICE.

DAVID WARREN, OF GETTYSBURG, PENNSYLVANIA.

IMPROVEMENT IN CAR-STARTERS.

Specification forming part of Letters Patent No. 147,207, dated February 3, 1874; application filed December 11, 1873.

*To all whom it may concern:*

Be it known that I, DAVID WARREN, of Gettysburg, in the county of Adams and in the State of Pennsylvania, have invented certain new and useful Improvements in Car-Starters; and do hereby declare that the following is a full, clear, and exact description thereof, reference being had to the accompanying drawings and to the letters of reference marked thereon, making a part of this specification.

The nature of my invention consists in the construction and arrangement of a car-starter, as will be hereinafter more fully set forth.

In order to enable others skilled in the art to which my invention appertains to make and use the same, I will now proceed to describe its construction and operation, referring to the annexed drawing, in which—

Figure 1:
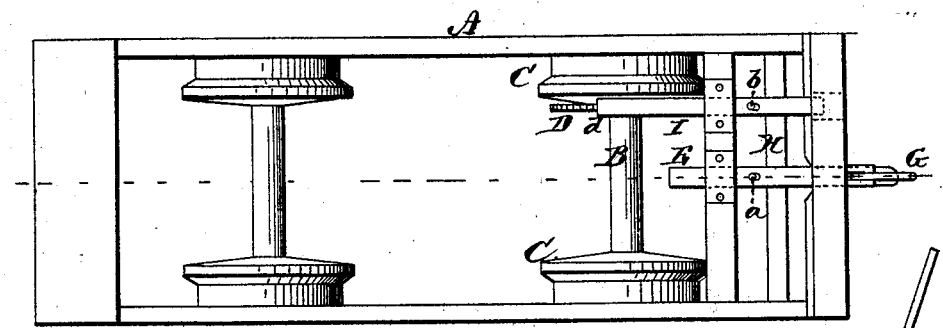
Figure 2:
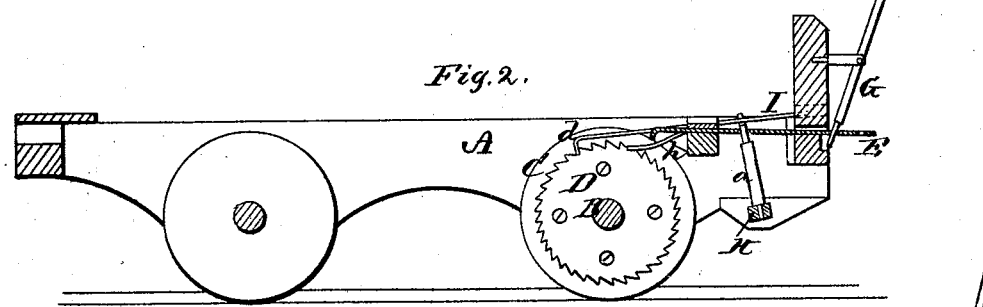
Figure 3:
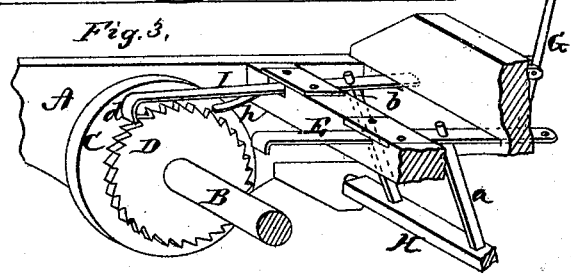

Figure 1 is a plan view of a car-truck embodying my invention. Fig. 2 is a longitudinal section of the same through the line $x\ x$, Fig. 1; and Fig. 3 is a perspective view of the car-starting mechanism.

A represents the frame of a car-truck. B is the front axle of the same, with the wheels C C. On the axle B, to the inner side of one of the wheels C, is attached a large ratchet-wheel, D. E represents the draw-bar, to the front end of which the horses are attached. This draw-bar is intended to operate the car-brake in such a manner that, by moving the bar inward or backward, by means of the lever G, which is pivoted at the front end of the car, the brakes will be applied, and when the horses pull on the bar it will move forward a certain distance, releasing the brakes. H represents a rocking bar or shaft, in the lower part at the front end of the frame A, which is provided with two arms, $a$ and $b$, extending upward, as shown. The upper end of the arm $a$ is inserted in a hole in the draw-bar E, and the upper end of the arm $b$ is inserted in a hole in a bar, I, which runs parallel with the draw-bar E, and moves in suitable guides on the truck-frame A. It will readily be seen that the bar I is moved back and forth by, and corresponding with, the movement of the draft-bar E. On the rear end of the bar I is formed or attached a hook, $d$, which works on the ratchet-wheel D, and on the under side of the bar is a spring or wedge, $h$.

When the draw-bar E is moved back to apply the brakes, the bar I is forced backward, so that the hook $d$ will engage with the ratchet-wheel. Then, as the horses pull the draw-bar E and release the car-brake, as above described, the bar I is also moved forward, and, by the hook $d$ and ratchet-wheel D, turn the front axle so as to start the car before the full weight thereof comes on the horses. As the bar I moves forward, the spring or incline $h$ enters one of the guides through which the bar passes, thereby raising the hook $d$ up from the ratchet-wheel D after the car has been started, and thus keep the hook away from the ratchet-wheel while the car is in motion.

I am aware that it is not new to operate a car-starter and a car-brake at one operation. I am also aware that it is not new to start a car by means of a ratchet-wheel attached on the car-axle, and a slide engaging with the ratchet-wheel; hence I disclaim such as being, broadly, my invention.

Having thus fully described my invention, what I claim as new, and desire to secure by Letters Patent, is—

1. In combination with the brake-operating draw-bar E, the rock-shaft H with arms $a\ b$, the bar I with hook $d$, and the ratchet-wheel D on the car-axle, all constructed substantially as and for the purposes set forth.

2. The spring or incline $h$, formed on or attached to the bar I, for the purposes herein set forth.

In testimony that I claim the foregoing I have hereunto set my hand this 21st day of November, 1873.

DAVID WARREN.

Witnesses:
H. J. SMITH,
F. L. OURAND.